United States Patent
Zisimopoulos et al.

(10) Patent No.: US 9,503,484 B2
(45) Date of Patent: *Nov. 22, 2016

(54) VOICE TRANSMISSION TECHNOLOGY SELECTION

(71) Applicant: Samsung Electronics Co., Ltd., Suwon-si, Gyeonggi-do (KR)

(72) Inventors: Haris Zisimopoulos, London (GB); Ricky Kaura, Uxbridge (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,205

(22) Filed: Nov. 30, 2015

(65) Prior Publication Data

US 2016/0080430 A1   Mar. 17, 2016

Related U.S. Application Data

(63) Continuation of application No. 13/521,155, filed as application No. PCT/KR2011/000316 on Jan. 17, 2011, now Pat. No. 9,219,759.

(30) Foreign Application Priority Data

Jan. 18, 2010 (GB) .................................. 1000755.7

(51) Int. Cl.
*H04L 29/06* (2006.01)
*H04W 48/18* (2009.01)
(Continued)

(52) U.S. Cl.
CPC ....... *H04L 65/1066* (2013.01); *H04L 65/1003* (2013.01); *H04L 65/1016* (2013.01);
(Continued)

(58) Field of Classification Search
None
See application file for complete search history.

(56) References Cited

U.S. PATENT DOCUMENTS 9,219,759 B2 * 12/2015 Zisimopoulos ....... H04W 48/18
2011/0090848 A1    4/2011 Kim et al.
(Continued)

FOREIGN PATENT DOCUMENTS

EP   2 330 852 A1   6/2011
GB   2 434 058 A    7/2007
(Continued)

OTHER PUBLICATIONS

NEC, "IMS Voice Support Indication in the GUTI Reallocation", 3GPP TSG SA WG2 Meeting #75E(Electronic), 52-096114, Oct. 21-28, 2009.
(Continued)

*Primary Examiner* — Huy D Vu
*Assistant Examiner* — James P Duffy
(74) *Attorney, Agent, or Firm* — Jefferson IP Law, LLP

(57) ABSTRACT

The present invention relates to a method of transmitting a signal by an MME (Mobility Management Entity) in a wireless network, the method comprising: receiving a tracking area update message from an UE (User Equipment); transmitting, on reception the tracking area update message, an Update Location message comprising an IMS voice over PS (Packet Switched) session supported indication to an HSS (Home Subscriber Server), wherein the IMS voice over PS session supported indication indicates whether or not an IMS Voice over PS Session is supported homogeneously in all tracking areas in the serving MME.

15 Claims, 6 Drawing Sheets

(51) Int. Cl.
*H04W 8/04* (2009.01)
*H04W 28/06* (2009.01)
*H04W 8/22* (2009.01)

(52) U.S. Cl.
CPC ....... *H04L 65/1059* (2013.01); *H04L 65/1063* (2013.01); *H04W 8/04* (2013.01); *H04W 48/18* (2013.01); *H04W 8/22* (2013.01); *H04W 28/06* (2013.01)

(56) References Cited

U.S. PATENT DOCUMENTS

2012/0106324 A1 5/2012 Keller et al.
2012/0269117 A1 10/2012 Hu et al.

FOREIGN PATENT DOCUMENTS

| GB | 2466677 A | 7/2010 |
|---|---|---|
| JP | 2013-517643 A | 5/2013 |
| WO | 03/039185 A1 | 5/2003 |
| WO | 2008/046445 A1 | 4/2008 |
| WO | 2008/120028 A1 | 10/2008 |
| WO | 2010/141788 A2 | 12/2010 |
| WO | 2011/008566 A2 | 1/2011 |

OTHER PUBLICATIONS

3GPP TS 23.060 V8.5.1, 3rd Generation Partnership Project; Technical Specification Group Services and System Aspects; General Packet Radio Service (GPRS); Service description; Stage 2(Release 8), Jun. 2009, pp. 1-25.

Samsung, "Failure of IMS registration as a trigger for voice domain selection", 3GPP TSG-CT WG1 Meeting #61, C1-094234, Oct. 12-16, 2009.

ETSI TS 123 401 V8.6.0, LTE; General packet Radio Service (GPRS) enhancements for Evolved Universal Terrestrial Radio Access Network (E-UTRAN) access (3GPP TS 23.401 version 8.6.0 Release 8), Jun. 2009, pp. 40-49.

HSS-based solutions to improve T-ADS in the SCC AS, 3GPP TSG SA WG2 Meeting #77, Jan. 18-22, 2010, TD S2-100443, Shenzhen, P.R. China.

Support for IMS voice over PS indicator for T-ADS, 3GPP TSG-SA WG2 Meeting #77, Jan. 18-22, 2010, S2-100349, Shenzhen, China.

3rd Generation Partnership Project; Technical Specification Group Services and System Aspects; IP Multimedia Subsystem (IMS) Centralized Services; Stage 2 (Release 9), Oct. 1, 2009, V9.3.0, 3GPP TS 23.292, 3GPP.

Nokia Siemens Networks et al., IMS Voice Indication, 3GPP TSG-SA2 Meeting #73, May 11-15, 2009, Change Request S2-094179, 3GPP, Sophia-Antipolis, France.

3GPP TS 23.401 v9.3.0 Release 9, published Jan. 2010, "LTE; General Packet Radio Service (GPRS) enhancements for Evolved Universal Terrestrial Radio Access Network (E-UTRAN) access (3GPP TS 23.401 version 9.3.0 Release 9)" Retrieved from: <http://www.3gpp.org/DynaReport/23401.htm>.

3GPP TS 23.401 v9.4.0 Release 9, published Mar. 2010, "LTE; General Packet Radio Service (GPRS) enhancements for Evolved Universal Terrestrial Radio Access Network (E-UTRAN) access (3GPP TS 23.401 version 9.3.0 Release 9)" Retrieved from: <http://www.3gpp.org/DynaReport/23401.htm>.

Change Request S2-1001590, 23.401 v9.3.0, NTT DOCOMO, Published Feb. 22-26, 2010, "HSS Optimisation for T-ADS", retrieved from: <http://www.3gpp.org/DynaReport/23401-CRs.htm>.

\* cited by examiner

VOICE TRANSMISSION TECHNOLOGY SELECTION

CROSS-REFERENCE TO RELATED APPLICATION(S)

This application is a continuation application of prior application Ser. No. 13/521,155, filed on Jul. 9, 2012, which is a U.S. National Stage application under 35 U.S.C. §371 of an International application filed on Jan. 17, 2011 and assigned application number PCT/KR2011/000316, which claimed the benefit under 35 U.S.C. §119(a) of a Great Britain patent application filed on Jan. 18, 2010 in the Intellectual Property Office of the United Kingdom and assigned Serial number 1000755.7, the entire disclosure of each of which is hereby incorporated by reference.

TECHNICAL FIELD

The present invention relates generally to wireless networks, and more specifically to a method and apparatus for assisting the selection of a voice transmission technology for use in a call.

BACKGROUND ART

Wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

Note that the term "GERA" is used herein to refer to the radio access technology associated with GERAN (GERA networks), "UTRA" is used to refer to the radio access technology associated with UTRAN (UTRA networks), and similarly the term "E-UTRA" or "LTE" is used to refer to the radio access technology associated with E-UTRAN (E-UTRA networks).

DISCLOSURE OF INVENTION

Technical Problem

LTE deployments may not support voice communication in all service areas, as in some service areas these may support data communication alone. LTE is designed primarily as a high speed packet switched network, and voice services, packet switched voice services and in particular a voice transmission technology known as Voice over Internet Protocol Multimedia Subsystem (VoIMS) services is envisaged, whereas previous generation systems such as UMTS support voice services using a voice transmission technology that is primarily circuit switched.

A method and apparatus is required for selection of voice transmission technology for use in a call.

Solution to Problem

In accordance with a first aspect of the present invention, there is provided a method of selecting a voice transmission technology for use in a call to a user equipment for use in a wireless network, the wireless network including a radio access network supporting communication using a radio access technology in service areas, each service area having either a capability to support a packet switched voice transmission technology throughout the service area or not having the capability to support the packet switched voice transmission technology throughout the service area, the user equipment being registered to the radio access network, the user equipment having a capability to support the packet switched voice transmission technology and a capability to support a circuit switched voice transmission technology, the method comprising:

setting an indicator to a positive state if all of the services areas within a part of the radio access network have the same capability to support a packet switched voice transmission technology and setting the indicator to a negative state if not;

dependent on a determination that the indicator is positive and the user equipment is in said part of the radio access network, selecting a voice technology for use in the call to the user equipment.

An advantage of the method is that signaling traffic may be reduced and delays associated with the signaling also reduced.

Preferably, said selection is dependent on a determination of a capability to support the packet switched voice transmission technology by the user equipment.

Preferably, dependent on a determination that the indicator is positive and that a result of a previous determination of a capability to support the packet switched voice transmission technology for the user equipment within the network is not held, polling a network element to request information regarding the capability of a service area to support the voice transmission technology and selecting a voice technology for use in the call to the user equipment dependent on the information.

The polling is advantageous if a previous determination is not held, as the information may then be cached and further polling may not be required for subsequent selections.

Preferably, dependent on a determination that the indicator is negative, the method comprises polling a network element to request information regarding the capability of a service area to support the voice transmission technology and selecting a voice technology for use in the call to the user equipment dependent on the information.

If the indicator is negative, then a previous determination may not be reliable, particularly if the exact service area information is not held.

Preferably, said part of a radio access network is an area that may be served by a Mobility Management Entity, such as a Tracking Area, or said part of a radio access network is an area served by a Serving General Packet Radio System Support Node, such as a Routing Area.

Preferably, said indicator may be a setting of a Home Subscriber Server (HSS) associated with said part of the radio access network. Typically, an HSS may not hold information relating to the capability of individual tracking areas or routing areas to support a voice transmission technology, so that it is advantageous for the HSS In some embodiments of the invention, said setting of the indicator to a positive state or to a negative state is on the basis of configuration data. The configuration data may be entered by an operator.

The method may comprise sending said information in response to a change of serving network for the user equipment. Preferably, the change of serving network for the user equipment is a change from a first part of a radio access network served by a first MME or SGSN to a second part of a radio access network served by a second MME or SGSN.

The method may comprise sending said information as part of an update location message. An advantage of sending said information as part of an update location message is that regular updates are provided that may be required in the event of system changes.

Advantageous Effects of Invention

In the existing technology, an ATI request may always result in a PSI request to the serving node to retrieve information from the serving network. In one embodiment of the invention the ATI request can be used to get the IMS VoIP indication (change to the ATI message) which would result in the HSS sending a PSI (modification required to the PSI message) to the serving network (MME/SGSN) to retrieve this indication for a particular user.

In an embodiment of the invention, the HPLMN (HSS) can intelligently decide whether the PSI is required depending on knowledge it has received (either by way of static configuration or dynamically) regarding the serving network.

In an embodiment of the invention the information from the served network (that may be later queried by the application server) may be provided prior to the HPLMN and cached in the HPLMN, prior to a query being requested for the information, avoiding the need to request this information from the VPLMN.

In an embodiment of the invention, the HSS may intelligently decide to poll the serving network periodically by overriding the decision not to send a PSI. After the expiry of a guard timer, or when the HSS has received a number of ATI requests for this user, the HSS may decide to send the PSI request to obtain the necessary information again. This would allow to alleviate any issues that may occur with configuration changes (or dynamic changes) in the MME/SGSN that may result in modifying the IMS VoIP capability for a particular user, and similarly for the case of homogenous voice support, where there is a decision to upgrade the MME/SGSN to homogenously support VoIP. However, for this case, an upgrade may normally result in the MME/SGSN sending a fresh Update Location on the next attach or TAU/RAU.

May avoid the need to continually request the IMS VoIP indication from the serving network when the serving network homogenously supports VoIP.

May avoids potential delays in the terminating process caused by retrieving this information from the serving network, especially when the UE has roamed.

Is a simple enhancement

Serving Network Element (MME/SGSN):

May provide the setting of the "IMS Voice over PS Supported" setting for a particular user in the Update Location message sent to the HSS (MAP request from the SGSN and Diameter request from the MME).

May provide the setting for the homogenous support of VoIP in all Tracking Areas or Routing Areas under control of the MME or SGSN.

Home Network Element (HSS):

May contain static configuration data related to the homogenous support of VoIP in all Tracking Areas or Routing Areas under control of the MME or SGSN.

May contain the logic as to whether to send a PSI request when the HSS receives an ATI request.

May be able to cache the IMS-VoIP-indication sent in the Update Location or as a result of a PSI query.

May be able to return cached data back to the T-ADS without the need to perform a PSI-query.

MODE FOR THE INVENTION

Figure 1:
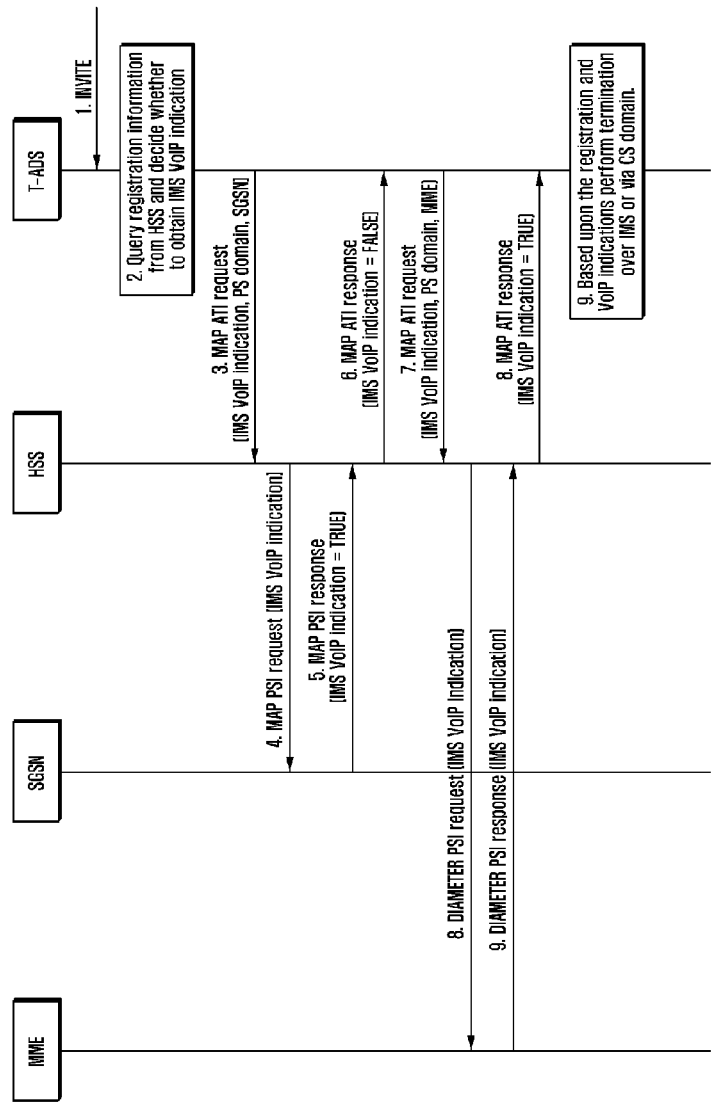
FIG. 1 is a schematic diagram showing signaling in an embodiment of the invention.

By way of example an embodiment of the invention will now be described in the context of a wireless network including a radio access network supporting communication using GERA/UTRA radio access technology, as associated with GERAN/UTRAN networks and another radio access network supporting communication using E-UTRA/LTE radio access technology, as associated with E-UTRA networks. However, it will be understood that this is by way of example only and that other embodiments may involve wireless networks using other radio access technologies, such as IEEE802.16 WiMax systems; embodiments are not limited to the use of a particular radio access technology.

Initial deployments of LTE systems are typically deployed within areas of coverage of existing wireless networks, such as legacy GSM and UMTS systems using GERA or UTRA radio access technologies. On initial deployment, the LTE systems may provide service to a smaller geographical area than that covered by existing legacy networks, covering for example city centres, and the areas covered may not be contiguous. Furthermore, only a subset of the available network features may be enabled, and the enablement of features may not be uniform across the network. In particular, due to its potentially enhanced data capacity in comparison with legacy systems, initial deployments of LTE may concentrate on providing high bandwidth data services, for example to LTE enabled equipment such as personal digital assistants (PDAs) or to user equipment in the form of plug in communication modules for laptop computers. For this reason, the primary LTE voice service, a packet switched service using a voice transmission technology known a Voice over IMS (VoIMS), may not be available in certain areas.

The SAE/LTE system (specified and standardized by 3GPP in TS 23.401 [2] and 24.301 [3]) is a PS only system. This means there is no CS domain and the voice calls in that SAE/LTE system are "natively" through the PS domain only. Hence as the "default option" these voice calls will be VoIP calls and the underlying call control protocol will typically be SIP supported through IMS. However, it is widely accepted that the CS domain will not disappear when SAE/LTE is first commercially deployed and there will be a slow migration of users from the CS domain to LTE. Consequently, LTE is likely to be deployed in "islands" overlaying parts of the CS domain. Additionally, the first deployments of LTE are likely not to support VoIP calls and may utilize fallback to the CS domain (CS Fallback) as defined in 3GPP TS 23.272 [4].

TS 23.221 [5] defines procedures for the UE to perform domain selection for voice calls and SMS. Domain selection uses information provided by the UE and network in deciding whether the UE should camp in LTE or move to 2G/3G for voice calls. One of the aspects for the UE to decide is whether it is able to make a VoIP call is whether the network can support "Voice Over IMS". When the UE attaches, the network returns an indication of whether VoIP is supported or not. This indication is returned to the UE when the UE performs attach in LTE or Tracking Area Update (TS 24.301 [3]) or PS attach in 3G or Routing Area Update (TS 24.008 [1]).

However, when the UE receives a call, it is the network that decides how best to route the call to the UE based upon the knowledge that the network has of the UE. The network has a function called Terminating Access Domain Selection (T-ADS) defined in TS 23.292 [6] that uses knowledge from the available domains and access networks where the UE is registered to best determine where the UE resides. Sometimes the UE is unable to accept the call in the access network or domain that the UE resides within. For example, the network may believe that the UE can receive a VoIP call in the 3G access network that the UE is currently registered in, but that network may not support VoIP, and it may attempt a VoIP call to the UE. In these cases, terminating access domain selection functionality in the UE (UE T-ADS) defined in TS 23.292 [6] is used to assist the UE to receive the call in the CS domain. UE T-ADS comes in two flavors; one flavor is for the UE to simply return a response (SIP 488) to indicate to the network that the call cannot be attempted over this access. Then the network tries the termination over an alternate domain. The other flavor is for the UE to intelligently (based upon the voice options that the network sent to the UE in the initial SIP INVITE) attempt itself to carry out the termination in the CS domain (this is known as CS-O or setting up the bearers for termination using CS origination procedures).

Although UE T-ADS assists the Network T-ADS in terminating the call to the UE, if the network can be better informed of the capabilities of the PS domain to support VoIP, there is a better chance that the termination will succeed as a VoIP termination. To do this, the network T-ADS may retrieve the "IMS Voice Over PS supported indication" from the PS access networks for this UE, where the UE has an existing registration. Specifically, the network T-ADS may retrieve the VoIP indication from the MME and the SGSN.

Note that in certain cases when Idle Mode Signaling Reduction (ISR) ? see TS 23.401 [2], the network is unable to know where the UE actually resides even though the network may have retrieved information related to the most recent access network where the UE resides and the IMS VoIP indications.

Terminating Access Domain Selection (T-ADS) is a function which resides in the IMS network (as part of the Service Centralization and Continuity Application Server). Its role is to determine how best to terminate a session/call to the user based upon the capabilities of the UE, capabilities of the access network and the registration details of the domains/access networks that the UE is attached to. The UE can also assist the network in terminating the call (UE T-ADS). When the network decides to terminate the call to the PS domain, it needs to know which access network the UE is currently resident in and also whether that access network supports VoIP. When ISR (Idle-Mode Signaling Reduction) is active, then the UE is attached in both LTE and 3G/2G.

One embodiment of the invention involves the T-ADS sending a query to the each of the serving domains (MME and SGSN) to obtain the VoIP indication. This is two ATI queries that create PSI queries to SGSN and to MME. The solution is fine, but it increases the time required for terminations, and it only required when voice support is NOT homogenous over all TAI-lists controlled by an MME or all RAIs controlled by an SGSN. There are cases that we have identified (with ISR activated and ISR not activated) that could benefit from some optimizations to allow the termination to succeed quicker. These optimizations are based upon logic in the HSS and modifications to the UL message sent from the MME-HSS and SGSN-HSS.

Regarding a solution for the retrieval of the "IMS Voice over PS Supported" Indication, one embodiment of the invention involves the home IMS network (T-ADS) retrieving the VoIP indication from the serving PLMN (SGSN/MME) by "pulling" this information via the HSS.

The SCC AS may send an Anytime-Interrogation (ATI) query to the HSS requesting the IMS VoIP indication from PS domain. The ATI query may indicate to the HSS whether a ProvideSubscriberInformation (PSI) query should be requested towards the SGSN or towards the MME. Based upon the known registration of the user (whether the user has registration in the SGSN and/or the MME), the T-ADS may send one or two ATI requests.

The HSS may be able to request from the serving PLMN (i.e. S4 SGSN and Gn/Gp SGSN) the IMS voice over PS capability of the registered RAT associated with the last known location (RAI) of the UE together with the time of the last radio contact at that location. The decision to activate ISR for a UE with "IMS voice over PS" capability may be based on local policy in the serving PLMN.

For a UE that is registered for voice service, the T-ADS located in the IMS may request the "IMS voice over PS session supported indication" from the serving PLMN (MME and/or SGSN) via the HSS. The serving nodes may provide the "IMS voice over PS session supported indication" together with the time of the last radio contact such that the T-ADS can determine the most recent indication.

For incoming sessions with speech media destined to a UE that is registered for voice service, the SCC AS may retrieve from the HSS the most recent access network's capabilities.

The HSS may be able to request, from the serving PLMN (i.e. MME and S4 SGSN), the IMS voice capability of the currently registered RAT associated with the last known location (TAI) of the UE together with the time of the last radio contact at that location. The decision to activate ISR for a UE with "IMS voice over PS" capability may be based on local policy in the serving PLMN.

FIG. 1 shows a protocol to implement an embodiment of the invention. According to this embodiment, when the MME or SGSN perform Update Location, the IMS VoIP indication may be provided in the Update Location. As a UE moves between Tracking Areas within the area served by the MME or the Routing Areas served by an SGSN, the receipt of a TAU or RAU do not trigger an Update Location towards the HSS. TS 23.041 [2] and TS 23.060 [8] state that the IMS VoIP indication is per TAI-list and per-RAI. This means in practice an MME could have separate TAI-lists where the cells in these TAIs either all support VoIP or all do not support VoIP. Similarly for the SGSN, it means that the SGSN can have a number of RAIs that have cells that all support VoIP or all do not support VoIP.

However, for the following configurations, there is the possibility of mixed support of VoIP capability:
Separate 2G and 3G (VoIP) RAs under one SGSN
Separate 3G (Non-VoIP) and 3G (VoIP) RAs under one SGSN In the above cases, when there is a change in the IMS VoIP capability (irrespective of whether the RAI is known to the UE), the UE may always perform an RAU to inform the network that the UE has now moved into or left an area that supports VoIP.

Therefore, there is the possibility that a UE may move to an RA under the control of an SGSN that has a different VoIP capability to the existing RA, and this movement would not cause an Update Location to be sent to the HSS. Hence, the reason to always get the IMS VoIP flags from the Serving PLMN.

As a second embodiment of the invention, it is proposed to optimize the above solution to factor in the cases where the home PLMN could provide the Voice Over IMS indication to the T-ADS, rather than querying each time the serving PLMN. The first embodiment of the invention may have the characteristic that when the UE has two PS locations in the HSS (SGSN and MME) i.e. ISR is enabled, then the T-ADS has to request two separate ATI requests. When the UE is roaming, this means that the HPLMN may have to contact the serving PLMN (send PSI to the serving PLMN) to obtain the flags. This has the potential of delaying the termination, especially in certain scenarios such as the flags being returned with the value of FALSE and the network deciding to terminate to the CS domain by performing SRI/PRN query to obtain the CS Routing Number (CSRN) followed by breaking out of IMS to route the call.

The idea to optimize the solution has two main parts:
1. Intelligent query and storage logic in the HSS based upon either static configuration of homogenous voice support, such as configuration data entered by an operator or dynamic information, such as data retrieved from another network part by means of messaging regarding homogenous voice support of that network part.
2. How the HSS is informed of the VoIP indication from the serving PLMN for a particular user.

For 1, the HSS, when it receives the ATI request, may not "blindly" send the PSI request to the serving network as shown in FIG. 1. Instead, it may read information (provided dynamically via Update Location or statically configured) in the HSS related to the location (MME/SGSN) that is recorded in the subscriber profile to determine whether a PSI is really required or not. This information we can term the homogenous-voice-support flag.

If the homogenous-voice-support (HVS) flag is set to TRUE, then the HSS knows that the current SGSN/MME supports VoIP or does not support VoIP over all TAs and RAs under the control of this particular SGSN/MME.

If the HVS flag is set to FALSE, then the HSS knows that the ability of the current SGSN/MME to support VoIP or not to support VoIP is not uniform over all TAs and RAs under the control of the SGSN/MME and must ALWAYS request the VoIP flag from the serving network.

The homogenous flag can be statically configured in the HSS for SGSN/MME identities, ranges or wildcards or could be sent in the Update Location message.

When the HSS determines that the serving PLMN is homogenous, the HSS needs to obtain an indication of the ability of the serving network to support a voice transmission technology, an example of the indication being the IMS VoIP flags from the serving PLMN, for the requested user, or to use a previously obtained flag. It could do this in a number of ways:

1. EITHER send the IMS VoIP flag in the Update Location (together with the HVS flag), and cache the HVS flag in system-data and cache the IMS VoIP flag in subscriber-data, thus the HSS never needs to send a PSI request when it receives an ATI request when the HVS flag is set to TRUE. That is to say, the IMS VoIP flag is sent to the HSS when a user equipment moves from the area served by one serving network to the area served by another serving network, e.g. from the area served by one SGSN or MME to the area served by another SGSN or MME. This flag may be cached at the HSS, so that if the served area to which the user equipment is registered has homogenous voice support, the HSS does not need to request the capability of the serving network to support a voice transmission technology while the user equipment remains registered to the serving network.

2. OR not send the IMS VoIP flag in the Update Location message, but when determining that the HVS flag is TRUE (either through static configuration or providing this flag in the UL), may only send the PSI to the serving network once, and when the PSI-acknowledge is received, then may cache the information in the HSS. Subsequent ATI requests from the SCC-AS may not result in the HSS subtending a PSI request to the serving PLMN.

The HVS flag may be cached in the system-level data in the HSS pertaining to that SGSN or MME.

The IMS VoIP flag may be cached in the subscriber-level location data in the HSS pertaining to that specific subscriber. This is because even though the MME/SGSN may support VoIP, the VoIP indication may be configured different for different users in the serving PLMN.

If the homogenous-VoIP flag was set to FALSE, then the IMS-VoIP flag may not be included. If the homogenous flag was set to TRUE, then the IMS-VoIP flag may be included, set to TRUE or FALSE.

Additionally, a timer could be associated with this HVS flag, such that after a particular time, the HSS is forced to send a PSI to the serving network to alleviate race conditions where the serving network may upgrade from being non-VoIP capable to being VoIP capable.

NOTE: Normally the serving network will mark its subscribers after an upgrade to ensure that the next activity forces the UE to send an Update Location, so the timer approach above is just a safe-guard.

Figure 3:
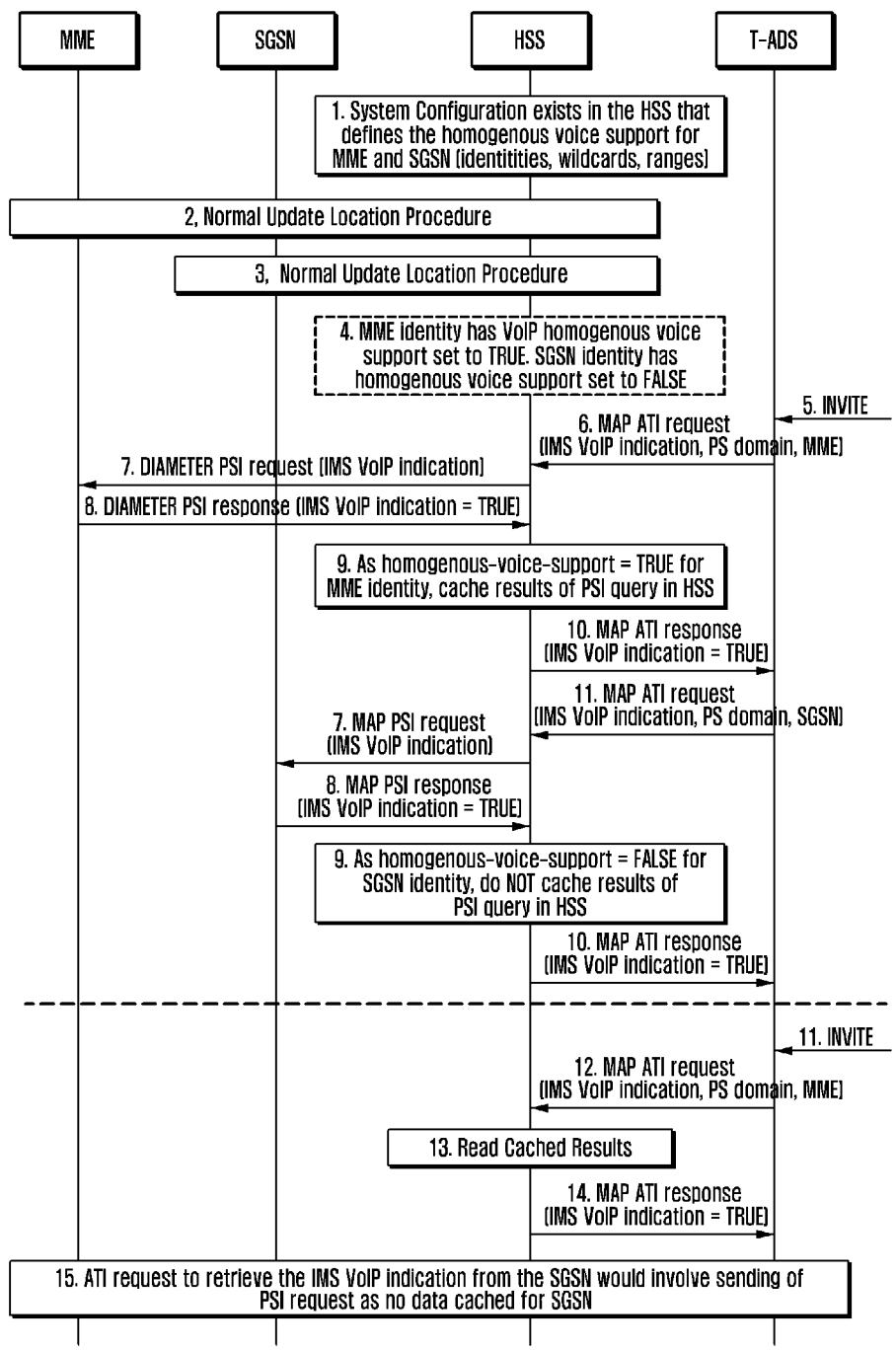
FIG. 3 is a schematic diagram showing signaling in an embodiment of the invention relating to caching with static configuration and reduced messaging approach.
Figure 6:
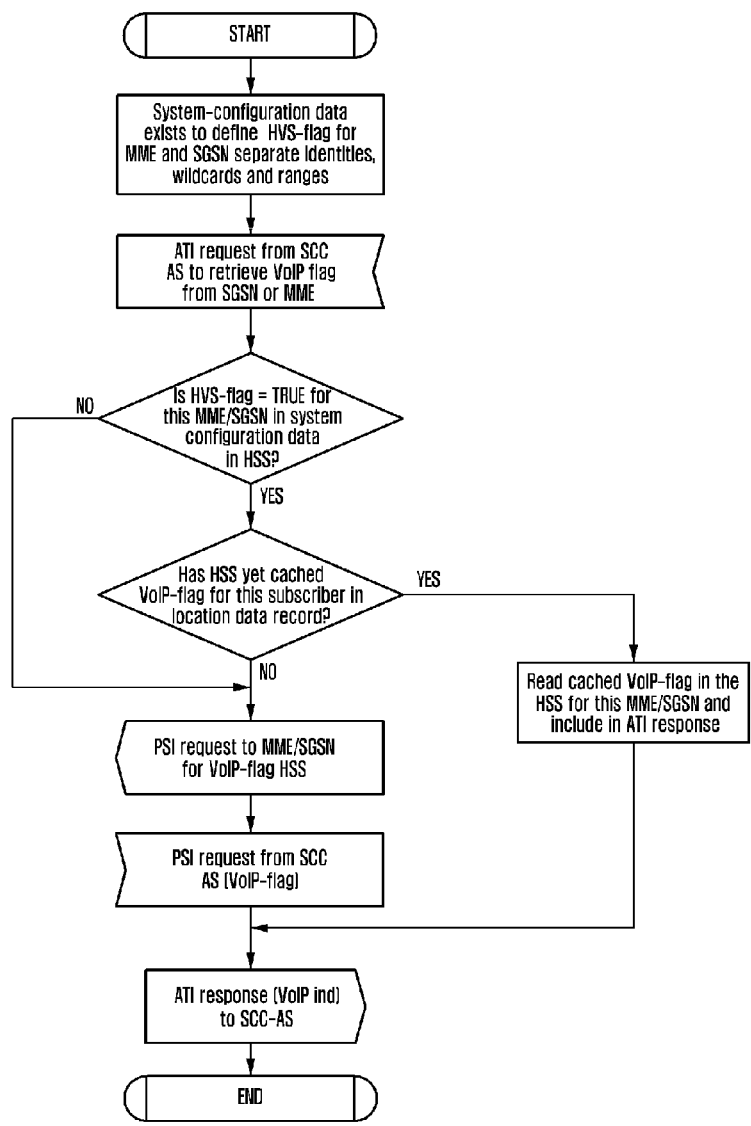
FIG. 6 is a flow diagram showing an embodiment of the invention static configuration and reduced messaging approach.

The various embodiments can be categorized and named as:
1. Caching with Static Configuration and Reduced Messaging (as illustrated in FIG. 3 and FIG. 6)

This solution may involve:

Static Configuration in the HSS regarding with MMEs and SGSNs have homogenous support of a voice transmission technology.

May only send PSI the first time when receiving ATI, that is to say only send PSI when result from PSI is not already cached. Cache the results from the PSI May never need to send PSI again when receiving an ATI unless a new location update is received (which deletes the cached data) or until a timer pops that is a safe guard for periodically sending the PSI.

Figure 4:
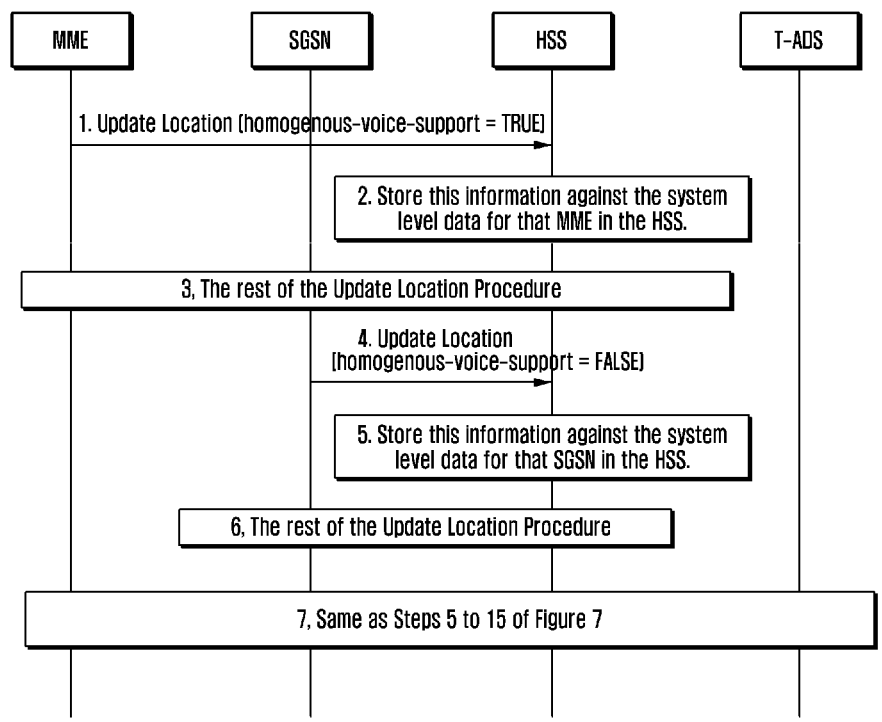
FIG. 4 is a schematic diagram showing signaling in an embodiment of the invention relating to caching with partial dynamic data and reduced messaging approach.

2. Caching with Partial Dynamic Data and Reduced Messaging (as illustrated in FIG. 4)

This solution may involve:

Sending the homogenous flag in the Update Location.

Only send PSI the first time when receiving ATI, that is to say only send PSI when result from PSI is not already cached. Cache the results from the PSI Periodically resetting the homogenous flag cached in the HLR to act as a safe guard to poll the serving network on receipt of the ATI.

Figure 2:
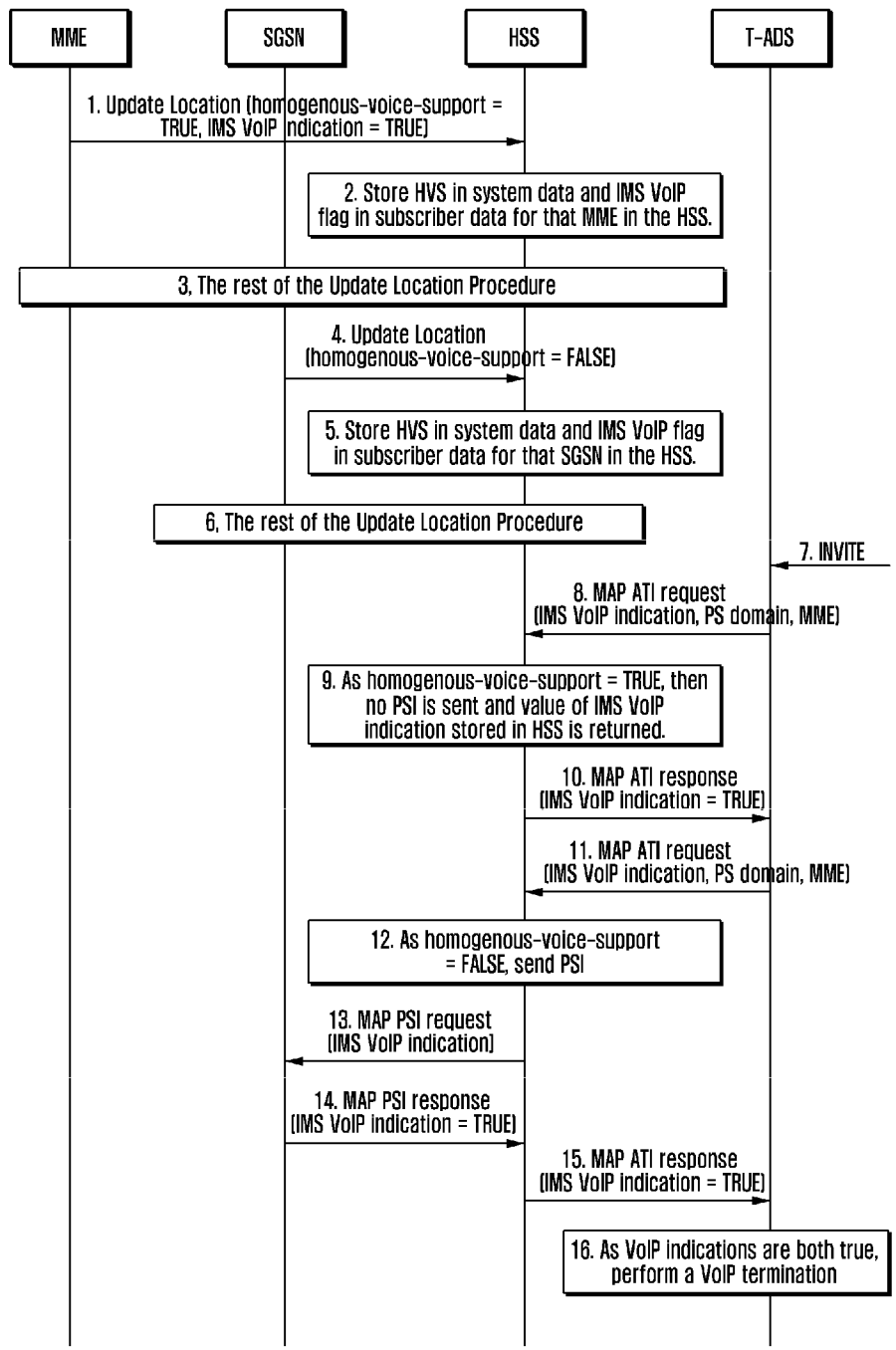
FIG. 2 is a schematic diagram showing signaling in an embodiment of the invention relating to caching with full dynamic data and no messaging approach.
Figure 5:
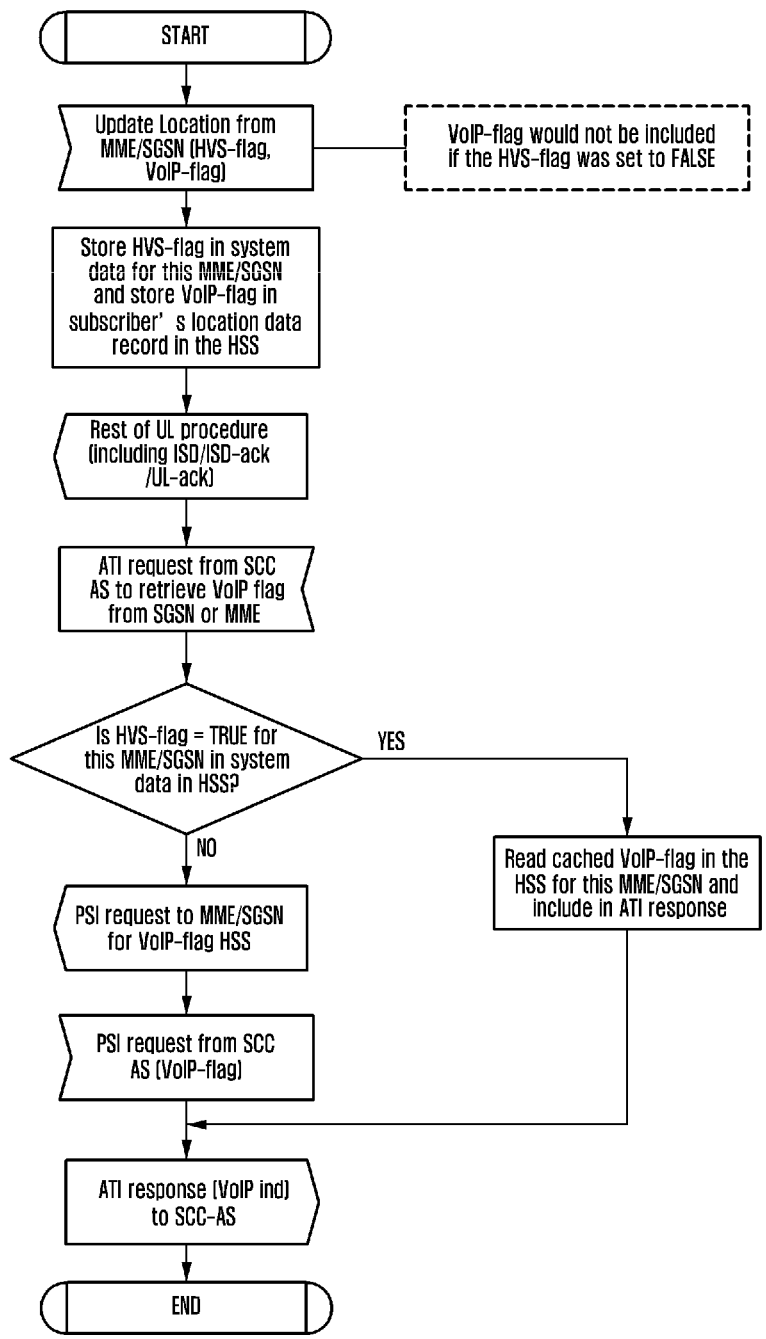
FIG. 5 is a flow diagram showing an embodiment of the invention relating to caching with full dynamic data and no messaging approach.

3. Caching with Full Dynamic Data and No Messaging (as illustrated in FIG. 2 and FIG. 5)

This solution may involve:

Sending both the homogenous flag and the VoIP indication in the Update Location.

Caching the received information from the PSI.

May never need to send a PSI if the homogenous flag is set.

Periodically resetting the homogenous flag cached in the HLR to act as a safe guard to poll the serving network on receipt of the ATI.

TABLE 1

Example of settings for the homogenous-voice-support flag

| | Configuration | Value of homogeneous-voice-support flag |
|---|---|---|
| 1 | All TAI-lists under control of same MME have homogenous voice support (all VoIP or all non-VoIP) | TRUE |
| 2 | The TAI-lists under control of the same MME do not have homogenous voice-support | FALSE |
| 3 | All 3G RAIs under control of same SGSN have homogenous voice support (all VoIP or all non-VoIP) | TRUE |
| 4 | Separate 2G and 3G VoIP RAIs under control of same SGSN | FALSE |
| 5 | Separate 3G Non-VoIP and 3G VoIP RAIs under control of same SGSN | FALSE |
| 6 | Common 3G VoIP and 3G Non-VoIP cells within the same RA | FALSE |
| 7 | Common 3G VoIP and 2G VoIP cells within the same RA | FALSE |

NOTE: configuration 2 is unlikely to be deployed. It is also unlikely that 3G HSPA RAs under control of the same MME are deployed that do not have homogenous VoIP support.

TABLE 2

Example of MAP_UPDATE_LOCATION Parameters

| Parameter name | Request | Indication | Response | Confirm |
|---|---|---|---|---|
| Invoke Id | M | M(=) | M(=) | M(=) |
| IMSI | M | M(=) | | |
| MSC Address | M | M(=) | | |
| VLR number | M | M(=) | | |

TABLE 2-continued

Example of MAP_UPDATE_LOCATION Parameters

| Parameter name | Request | Indication | Response | Confirm |
|---|---|---|---|---|
| LMSI | U | C(=) | | |
| Supported CAMEL Phases | C | C(=) | | |
| SoLSA Support Indicator | C | C(=) | | |
| IST Support Indicator | C | C(=) | | |
| Super-Charger Supported in Serving Network Entity | C | C(=) | | |
| Long FTN Supported | C | C(=) | | |
| Supported LCS Capability Sets | C | C(=) | | |
| Offered CAMEL 4 CSIs | C | C(=) | | |
| Inform Previous Network Entity | C | C(=) | | |
| CS LCS Not Supported by UE | C | C(=) | | |
| V-GMLC Address | U | C(=) | | |
| IMEISV | C | C(=) | | |
| Skip Subscriber Data Update | U | C(=) | | |
| Supported RAT Types Indicator | U | C(=) | | |
| Paging Area | U | C(=) | | |
| IMS-Voice-Info | C | C(=) | | |
| ADD Capability | | | U | C(=) |
| Paging Area Capability | | | U | C(=) |
| HLR number | | | C | C(=) |
| User error | | | C | C(=) |
| Provider error | | | | O |

TABLE 3

```
UpdateLocationArg ::= SEQUENCE {
    imsi                        IMSI,
    msc-Number                  [1] ISDN-AddressString,
    vlr-Number                  ISDN-AddressString,
    lmsi                        [10] LMSI OPTIONAL,
    extensionContainer          ExtensionContainer    OPTIONAL,
    ...,
    vlr-Capability              [6] VLR-Capability    OPTIONAL,
    informPreviousNetworkEntity [11] NULL             OPTIONAL,
    cs-LGS-NotSupportedByUE     [12] NULL             OPTIONAL,
    v-gmlc-Address              [2] GSN-Address       OPTIONAL,
    add-info                    [13] ADD-Info         OPTIONAL,
    pagingArea                  [14] PagingArea       OPTIONAL,
    skipSubscriberDataUpdate    [15] NULL             OPTIONAL,
    ims-voice-info              [16] IMS-Voice-Info   OPTIONAL,
    -- The skipSubscriberDataUpdate parameter in the
    UpdateLocationArg and the ADD-Info
    -- structures carry the same semantic.
    }
IMS-Voice-Info ::= BIT STRING {
    homogenous-voice-supported (0),
    ims-voice-supported (1) } {SIZE (2..8)}
-- exception handling: bits 3 to 7 shall be ignored if received and
not understood
```

TABLE 4

Diameter Update Location Request

| Information element name | Mapping to Diameter AVP | Cat. | Description |
|---|---|---|---|
| IMSI | | | |
| | User-Name (See IETF RFC 3588 [4]) | M | This information element shall contain the user IMSI, formatted according to 3GPP TS 23.003 [3], clause 2.2. |
| Supported Features | | | |
| (See 3GPP TS 29.229 [9]) | Supported-Features | O | If present, this information element shall contain the list of features supported by the origin host. |
| Terminal Information | | | |
| (See 7.3.3) | Terminal-Information | O | |
| This information element shall contain information about the user mobile equipment. Within this Information Element, only the IMEI and the Software-Version AVPs shall be used on the S6a/S6d interface. | | | |
| ULR Flags | | | |
| (See 7.3.7) | ULR-Flags | M | This Information Element contains a bit mask. See 7.3.7 for the meaning of the bits. |
| Visited PLMN Id | | | |
| (See 7.3.9) | Visited-PLMN-Id | M | |
| This IE shall contain the MCC and the MNC, see 3GPP TS 23.003 3. It may be used to apply roaming based features. | | | |
| RAT Type | | | |
| (See 7.3.13) | RAT-Type | M | This Information Element contains the radio access type the UE is using. See section 7.3.13 for details. |
| SGSN number | | | |
| (See 7.3.102) | SGSN-Number | C | |
| This Information Element contains the ISDN number of the SGSN, see 3GPP TS 23.003 3. It shall be present when the message is sent on the S6d interface and the SGSN supports LCS or SMS functionalities. It may be present when the message is sent on the S6ainterfaceandthereq uestingnodeisacombin edMME/SGSN. | | | |
| IMSvoiceinfo | IMSVoiceInfo | C | This IE shall contain information related to the homogenous support of VoIP in the serving PLMN and the value of the IMS voice indication |

Example of Update-Location-Request (ULR) Command

The Update-Location-Request (ULR) command, indicated by the Command-Code field set to 316 and the "R" bit set in the Command Flags field, is sent from MME or SGSN to HSS.

Message Format

```
<Update-Location-Request>::=<Diameter Header: 316,
   REQ, PXY, 16777251>
<Session-Id>
[Vendor-Specific-Application-Id]
{Auth-Session-State}
{Origin-Host}
{Origin-Realm}
[Destination-Host]
{Destination-Realm}
{User-Name}
*[Supported-Features]
[Terminal-Information]
{RAT-Type}
{ULR-Flags}
{Visited-PLMN-Id}
[SGSN-Number]
[IMSVoiceInfo]
*[AVP]
*[Proxy-Info]
*[Route-Record]
```

Abbreviations

ATI Any Time Interrogation

CS Circuit Switch
EPS Enhanced Packet System
E-UTRAN Evolved UTRAN
gsmSCF GSM Service Control Function
IMS IP Multimedia Subsystem
IP Internet Protocol
ISR Idle-Mode Signaling Reduction
LTE Long Term Evolution (relate most to the Radio Access Network)
MSC Mobile Switching Centre
MME Mobility Management Entity
PLMN Public Land Mobile Network
PSI Provide Subscriber Information
RA Routing Area
RAI Routing Area Identity
RAU Routing Area Update
SAE System Architecture Evolution
SCC AS Service Centralisation and Continuity Application Server
SGSN Serving GPRS Service Node
TA Tracking Area
T-ADS Terminating Access Domain Selection
TAI Tracking Area Identity
TAU Tracking Area Update
UE User Equipment
UL Update Location
UMTS Universal Mobile Telecommunications System
UTRAN UMTS Terrestrial Access Network
VoIP Voice over IP
XML eXtended Mark-up Language

What is claimed is:

1. A method by a mobility management entity (MME) in a wireless network, the method comprising:
receiving, from a base station, a message including a tracking area update request message, which is originated from a user equipment (UE); and
transmitting, to a home subscriber server (HSS), based on reception of the message to update location information of the UE, an update location message including information, which is used to select a domain between one of a packet switch or a circuit switch in a terminating access domain selection (TADS), to indicate whether an internet protocol (IP) multimedia subsystem (IMS) voice over packet switched (PS) session is supported homogeneously in tracking areas for the UE in the MME.

2. The method of claim 1, wherein the information to indicate whether the IMS voice over PS session is supported is stored in the HSS.

3. The method of claim 2, wherein the information to indicate whether the IMS voice over PS session is supported is used in order to avoid requesting, by the HSS, whether the IMS voice over PS session is supported to the MME.

4. The method of claim 1, wherein the information to indicate whether the IMS voice over PS session is supported is set to "Supported" when all tracking areas in the MME support the IMS voice over PS session.

5. The method of claim 1, wherein the information to indicate whether the IMS voice over PS session is supported is set to "Not supported" when all tracking areas in the MME do not support the IMS voice over PS session.

6. A mobility management entity (MME) in a wireless network, the MME comprising:
a transceiver configured to transmit and receive a signal; and
a controller configured to:
receive, from a base station, a message including a tracking area update request message, which is originated from a user equipment (UE), and
transmit, to a home subscriber server (HSS), based on reception of the message to update location information of the UE, an update location message comprising information, which is used to select a domain between one of a packet switch or a circuit switch in a terminating access domain selection (TADS), to indicate whether an internet protocol (IP) multimedia subsystem (IMS) voice over packet switched (PS) session is supported homogeneously in tracking areas for the UE in the MME.

7. The MME of claim 6, wherein the information to indicate whether the IMS voice over PS session is supported is stored in the HSS.

8. The MME of claim 7, wherein the information to indicate whether the IMS voice over PS session is supported is used in order to avoid requesting, by the HSS, whether the IMS voice over PS session is supported to the MME.

9. The MME of claim 6, wherein the information to indicate whether the IMS voice over PS session is supported is set to "Supported" when the all tracking areas in the MME support the IMS voice over PS session.

10. The MME of claim 6, wherein the information to indicate whether the IMS voice over PS session is supported is set to "Not supported" when the all tracking areas in the MME do not support the IMS voice over PS session.

11. A system in a wireless network, the system comprising:
a user equipment (UE) configured to transmit a tracking area update request message to a base station, the base station configured to:
receive the tracking are update request message, and
transmit the message including the tracking area update request message to a mobility management entity (MME),
wherein the MME is configured to:
receive the message from the base station, and
transmit, based on reception of the message to update location information of the UE, to a home subscriber server (HSS), an update location message comprising information, which is used to select a domain between one of a packet switch or a circuit switch in a terminating access domain selection (TADS), to indicate whether an internet protocol (IP) multimedia subsystem (IMS) voice over packet switched (PS) session is supported homogeneously in tracking areas for the UE in the MME, and
wherein the HSS configured to receive the update location message from the MME.

12. The system of claim 11, wherein the HSS stores the information to indicate whether the IMS voice over PS session is supported on receiving the update location message.

13. The system of claim 12, wherein the information to indicate whether the IMS voice over PS session is supported is used in order to avoid requesting, by the HSS, whether the IMS voice over PS session is supported to the MME.

14. The system of claim 11, wherein the information to indicate whether the IMS voice over PS session is supported is set to "Supported" when all tracking areas in the MME support the IMS voice over PS session.

15. The system of claim 11, wherein the information to indicate whether the IMS voice over PS session is supported is set to "Not supported" when all tracking areas in the MME do not support the IMS voice over PS session.

* * * * *